April 17, 1956  W. R. KROMER  2,742,048
METHOD AND MEANS FOR TREATING AND DISPENSING BEVERAGE
Filed March 31, 1951  4 Sheets-Sheet 3

INVENTOR.
WALLACE R. KROMER
BY
ATTORNEYS

April 17, 1956  W. R. KROMER  2,742,048
METHOD AND MEANS FOR TREATING AND DISPENSING BEVERAGE
Filed March 31, 1951  4 Sheets-Sheet 4

INVENTOR.
BY WALLACE R. KROMER
ATTORNEYS ial # United States Patent Office 2,742,048
Patented Apr. 17, 1956

2,742,048

METHOD AND MEANS FOR TREATING AND DISPENSING BEVERAGE

Wallace Raymond Kromer, East Cleveland, Ohio, assignor to The Superflow Manufacturing Company, Cleveland, Ohio, a corporation of Ohio Application March 31, 1951, Serial No. 218,667

26 Claims. (Cl. 137—12.5)

This invention relates to improved methods and means for treating, storing and dispensing beverages and more particularly to cooling, preparing and preserving and dispensing carbonated beverages such as beer.

While my invention pertains to the solution of the problem of the treatment, preservation, cooling and dispensing of carbonated or gas absorbed beverages generally, the problem and my solution is illustrated and exemplified in connection with beer, and therefore I shall speak essentially of beer in the following description of my invention as illustrative of the several different kinds and classes of fluids and/or gas charged or embracing beverages with which my invention is concerned.

Various problems attending dispensing beer have long been known, certain aspects and solutions of which have been disclosed in the prior U. S. Patents Nos. 2,320,969 and 2,335,595 for the joint inventions of myself and another.

Beer delivered to taverns in kegs must be maintained at cool enough temperatures for its preservation before it is dispensed and should be served under conditions, including control of temperature and pressure, which enhance and/or preserve its head, quality, taste and flavor. Prior methods and means of seeking the results of known desirability have heretofore been relatively costly of installation and operation, wasteful of beer and not satisfactory in a number of respects that will more fully appear by comparison with the objects and advantages of my invention herein disclosed.

For example, prior practices have proceeded on the assumption that beer should, or must, lie quiescent in the keg and the lines, conduits or cooling coils between the keg and the dispensing faucet except when beer is being drawn from the faucet. This prior assumption and practice has required many extrinsic means and media for cooling the keg, lines and faucet. Ice,, circulating air and water with their attendant containers, conduits, coolers and circulators have been generally employed and have complicated the mechanism and enlarged the first cost and the cost of maintenance and repair without solving the problem. Among the different aspects of the problem are the requirements for cold storage of the kegs or supply vessels, the tendency of the quiescent beer in the coils and lines to "work" and precipitate out sediment and residuum, the necessity for frequent cleaning of the lines and coils, the depreciation of quality of beer in the system, the loss or separation of gas from liquid in the keg and lines, the overflow of cooling medium, and the cost of power necessitated by the number and variety of cooling media required to cool the beer and the system.

The solution which my invention provides, proceeds quite oppositely of prior practice and employs motion rather than quiescence of the beverage to be stored and dispensed. From the concept of moving the beverage substantially continuously throughout the system including the cooling parts or coil thereof, I have proceeded to the objects, advantages, method and means of my invention more fully set forth below. For example, according to my invention, beer is always dispensed from a moving stream flowing past the faucet or dispensing point so that each glass has the same persistent freshness, quality and flavor at least equal to the best that could be drawn from the keg under most favorable conditions. Moreover beer drawn from a moving stream tends to partake of the extra goodness that distinguishes water flowing in a mountain brook from still water. By cooling the moving stream of beer and causing it to flow in a closed circuit within an insulated sheath or protection the whole system is made to be self-cooling in the sense of being freed from water jacketed lines and cold storage rooms.

It is among the objects of my invention to provide a carbonated beverage dispensing system that insures uniform excellence of taste, quality, flavor and freshness of all the dispensed beverage all the time; that maintains continuously at the dispensing point a moving stream of beverage of the temperature, pressure and carbonation desired; that permits no quantity of beverage anywhere in the system to depart from a condition favorable to its preservation and preparation for its intended purpose; that avoids stagnation, sedimentation, secondary fermentation, separation or any other deleterious effect on the beverage throughout all time and conditions from storage to consumption; that avoids the use of all cooling means and agencies except directly upon the beverage at one convenient point in the system and is self-cooling in respect to all parts of the system except where the beverage is itself cooled; that is inherently self-cleaning and sanitary; that is economical of parts, materials and in installation and operation; that eliminates the need for cold storage vault or room for any or reserve kegs or containers; that is flexible in design, permitting the main elements to be widely or closely spaced, conveniently located and simply connected; and that affords efficient and economical cooling and operation, and a minimum service and care throughout a long life. More particular objects are to circulate all the beverage in a continuous stream in a closed circuit throughout the whole system from faucet to and including the supply vessel or vessels while maintaining a gas such as $CO_2$ pressure on the beverage in limited controlled excess of the natural pressure of the warmest beverage in the system and continuously cooling the flowing stream of beverage to cool all the beverage in the system while maintaining a particular temperature at the faucet. Another object is to maintain a desired temperature and condition in a beer supply line between a source of supply and a dispensing faucet by parallel disposition of a return line with the supply line in a common insulating cover, circulating beer through both lines and cooling the beer in one of them.

Other objects and advantages of my invention will appear from the following description of preferred and modified forms, practices and embodiments of my invention, reference being had to the accompanying drawings in which.

To carry out the objects of my invention in the several forms described more particularly below, I cause all the beverage to be dispensed to be continuously circulated throughout a closed circuit which in my preferred form or forms includes all parts of the system with the storage vessel or vessels and the shank of the dispensing faucet along with all the lines and cooling coils. In a modified form the circuit within which the continuously circulating beverage flows may exclude the keg or storage receptacle but include substantially all the lines and instrumentalities between the keg and the faucet. Common to all forms of my invention I provide, in addition to a main supply line leading from the source of supply to the faucet and embracing cooling coils, a return line embracing a circulating pump in a closed circuit with all or substantially all of the main line whereby to induce a continuous flow of beverage through the main supply line and cooling coils to the shank of the faucet and thence back through the return line and pump and through the cooling coils. In this way I employ the beverage itself as the cooling medium for all parts of the system embraced in the circuit of the continuous flow of beverage and get rid of all extrinsic cooling media and instrumentalities that heretofore have been employed to maintain the beverage cool, particularly in the periods when the beverage is not being drawn through the line for the purpose of dispensing or serving the same. When, as I prefer, all of the beverage in the entire system including all the storage receptacles or kegs is continuously circulated, then the single cooling coil or instrumentality disposed in the main supply line between the keg or kegs and the dispensing faucet serves not only to cool the beverage that is being dispensed to a proper dispensing temperature during the drawing of beverage, but also is employed to cool the entire system and always maintain the temperature of beverage immediately adjacent the valve closure of the dispensing faucet at precisely the temperature desired for each draught of beverage.

In conjunction with the continuous circulation of the beverage to be dispensed, I prefer to maintain the whole system under a controlled desirable pressure preferably slightly in excess of the natural pressure of the carbonated beverage at the temperature of the beverage flowing from or contained in the storage vessel or vessels. At least with the maintenance of such a pressure I have found it entirely practicable to recirculate the beverage at a relatively slow rate, but as rapidly as advantageous for my several purposes by the use of a slow speed positive displacement pump, all without cavitation and without any deleterious effects, but rather with benign effects on the beverage. The continuous circulation and movement of the beverage under the conditions pertaining to the practice of my invention maintains and enhances the quality, taste and freshness of the beverage uniformly from the first to the last increment dispensed from the storage vessel or vessels and maintains or tends to maintain all parts of the system that contain beverage clean and fresh and free from sedimentation or other uncleanliness.

Although my system tends to be inherently free from tendency to require cleaning still it lends itself to self-cleaning as by merely tapping a vessel of cleaning fluid such as a sal soda solution and drawing and circulating the cleaning fluid for such time as may be necessary or desirable to clean or reclean the system.

Figure 1:
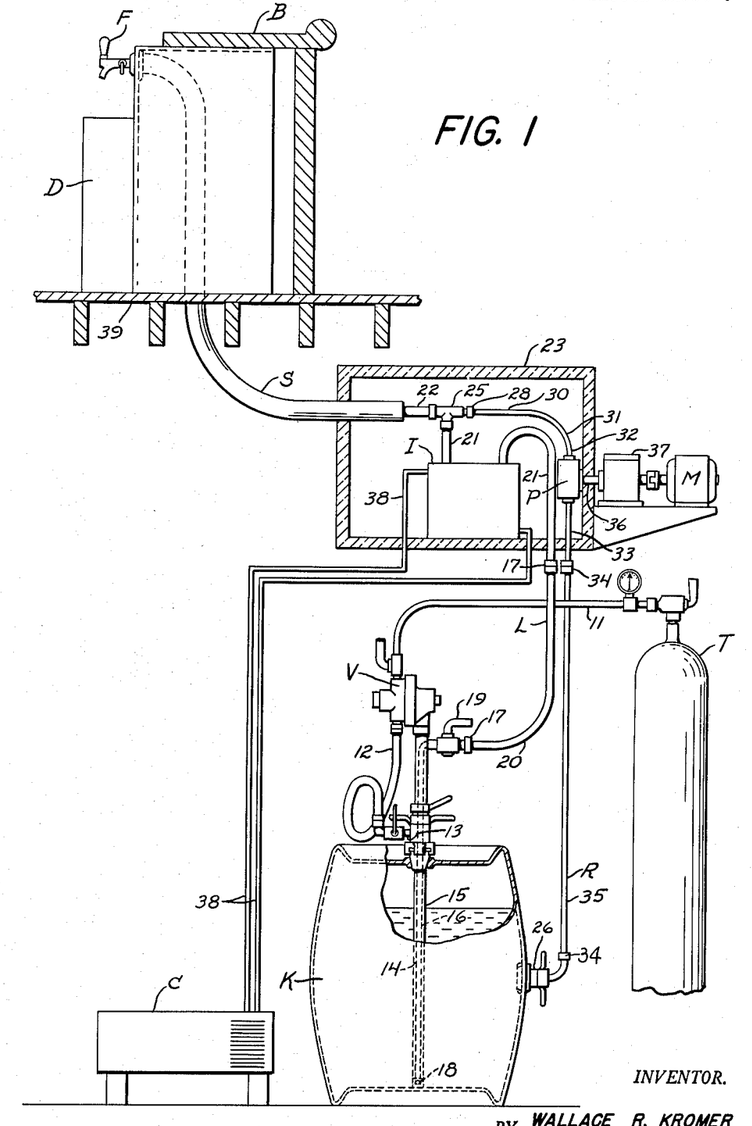
Figure 1 is a partly diagrammatic layout of a first preferred form of system embodying my invention.
Figure 2:
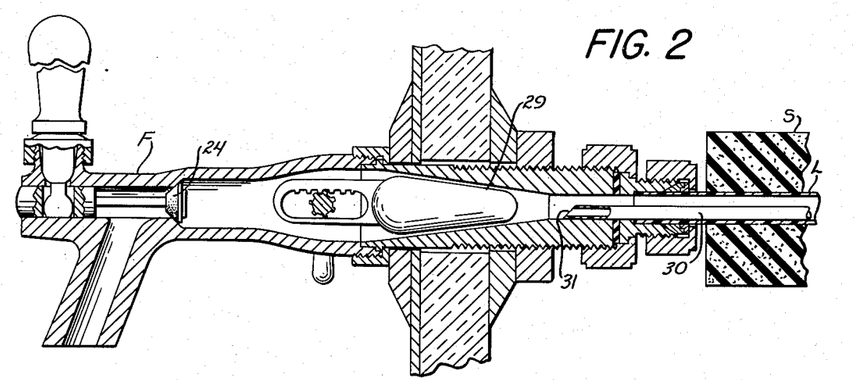
Figure 2 is a partially broken longitudinal section taken through the dispensing faucet and adjacent connected parts of Figure 1.
Figures 3, 5:
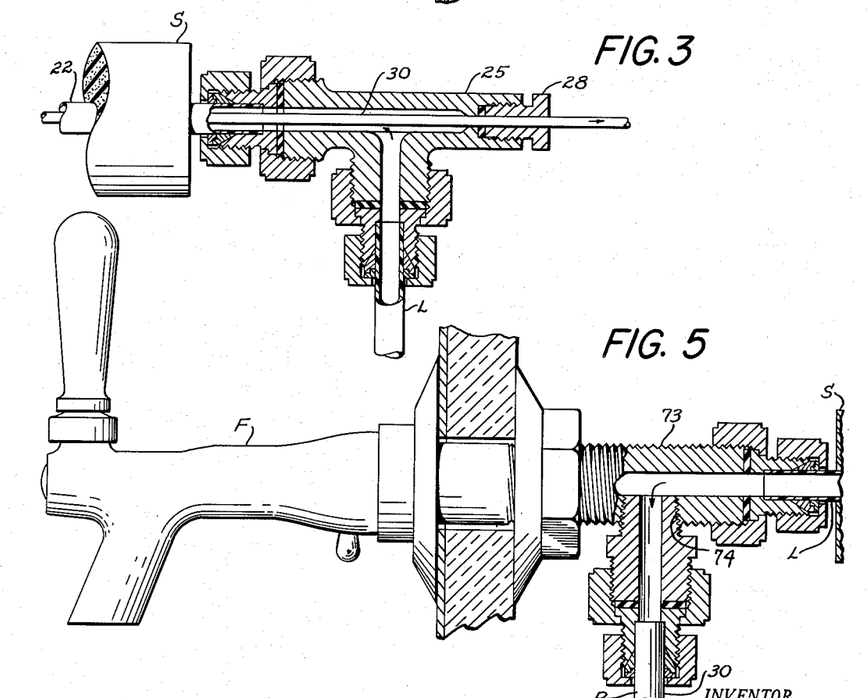
Figure 3 is a partially broken longitudinal section of T junction of the supply and return lines of Figure 1.
Figure 5 is a partially broken longitudinal section of the faucet and adjacent connected parts of Figure 4.

Referring to the form of my invention disclosed in Figures 1, 2 and 3, there is provided a keg K containing the carbonated beverage such as beer to be dispensed, a tank T of $CO_2$ under pressure connected with the upper end of the keg through a regulating valve V for maintaining a desired gas pressure within the keg, an instantaneous cooler I through which the beverage flows to the dispensing faucet F adjacent the bar B; the instantaneous cooler being cooled by refrigerant supplied from a conventional refrigeration machine C through refrigerant lines 38.

In this form of my invention, I prefer to employ the tap rod R and regulating valve V of the form corresponding to that shown in Figures 1 and 2 of my Patent No. 2,335,595, issued November 30, 1943, to Harvey F. Elliott and me. As more fully illustrated and described in that patent the regulating valve V admits $CO_2$ gas under pressure from the tank T through the lines 11 and 12 to the upper portion of the keg K by way of an appropriate orifice and fittings at 13 externally of the tap rod per se and in sealed relation to the head of the keg. Also as described in my prior patent the regulating valve V preferably bleeds $CO_2$ gas from the keg to atmosphere as well as supplies $CO_2$ gas to the keg wherewith to maintain with accuracy a gas pressure in the keg in substantially uniform excess of the natural pressure developed by the beverage throughout the range of temperature of the beverage that are encountered or maintained from the time the keg is delivered until its contents are consumed. As more fully explained in my prior patent the pressure in the keg is caused to respond to the temperature of the contents of the keg by the employment of thermal-responsive fluid sealed in the space 14 between the outer shell 15 of the tap rod and the inner beverage conduit 16 thereof. The pressure of the thermal-fluid which varies with changes in temperature of the beverage acts upon the regulating valve to maintain a gas pressure in the keg preferably about two pounds higher than the natural pressure of the beverage; such pressure being higher when the beverage is relatively warm and being appropriately lower when the beverage becomes cooler.

Beverage is drawn or flows from the keg through the conduit 16 entering the same through appropriate orifices 18 at the bottom of the tap rod. The conduit 16 leaves the tap rod at an angle connection traversing the shell 15 and terminating in a hand cock 19 where it is appropriately connected to flexible conduit 20 which is part of the main supply line L that leads to the dispensing faucet.

For convenience of description the main supply line L may be taken to embrace the conduit 16, the flexible conduit 20, the continuation thereof comprising the conduit 21 with the cooling coils, not shown, disposed within the cooler I, the T connection 25 and the conduit 22 leading from the T connection to the shank of the faucet F, see Figures 2 and 3. Preferably the flexible conduit 20 is detachably connected to the cock 19 and to the conduit 21 with detachable fittings 17 to facilitate the tapping of the kegs containing the beverage. In this form of my invention I provide an insulated chamber 23 within which the cooler I is disposed along with the adjacent parts of the main and return lines and the pump P. The chamber 23 may be conveniently mounted on the wall or other fixed support with respect to which the keg K and tank T may be moved readily as replacement thereof is required from time to time.

Preferably that part of the supply line L comprising the conduit 22 is encased in flexible insulating sheath or pipe S, one end of which enters the chamber 23 through a closely fitting aperature in one of the walls thereof and the other end reaches to and preferably embraces the shank of the faucet as well as the conduit 22; the sheath serving to insulate the contents of the conduit 22 from heat-gain. In this form of my invention the return line R extends all the way from the shank of the faucet F, Fig. 2, back to the bung 26 of the keg and leads through the pump P which induces flow of beverage therein in the direction from the faucet to the keg. In particular the return line comprises a small tube 30 disposed interiorly of the conduit 22 with its "far" end 31 disposed well within the shank of the faucet F and its other or "near" end 32 connected to the intake side of the pump P.

The faucet F may take various forms, my preference being, as shown in Fig. 2, that its shank afford a smooth connection with the supply line; that the passage to the closure member 24 taper smoothly to a reduced diameter and that either before or behind the closure there be provided an adjustable smooth flowing restriction such as the tapered plug 29 with which the gross size of the effective orifice of the faucet as a whole can be changed. By this means a substantially constant optimum rate of discharge from the faucet can be provided against the rather wide differences in pressure that are to be encountered in beer, which, for example, is to have pressures upon it proportional to its natural pressure for its different keg temperatures. That is to say, when keg temperature is at about 65° F. I prefer that the $CO_2$ pressure be about 25 to 27 pounds per square inch and when the keg is cooled to 40° F. the $CO_2$ pressure may be at about 13 to 14 pounds per square inch. Thus to get approximately 2½ ounces of beer per second delivered from the fully opened faucet the plug 29 may be moved rightwardly as shown to restrict the orifice at the high pressure and moved leftwardly to enlarge the orifice at the lower pressures, see for example my prior Patent No. 2,162,842.

As shown particularly in Figure 3, the tubular conduit 30 traverses the T connection 25 leaving the supply line L at the T through the packing gland 28 which seals off the opening from the supply line through which the conduit 30 extends. The return line also comprises a short length of conduit 33 extending between the outlet side of the pump P and a detachable connection 34 where it is connected to flexible conduit 35 that leads to the hand cock 27 via another detachable connection 34 and enters the bung 26, providing a passage for the return fluid through the bung into the keg.

As shown more or less diagrammatically in Figure 1, the pump P with the associated parts of the return line is located within the insulated chamber 23 with its drive shaft 36 extending through a rather closely fitting aperture in the adjacent wall of the chamber 23 where the drive shaft is connected to and driven by a speed reducer or variable speed reducer 37 that in turn is driven by a motor M. By this means I exclude the heat of the motor and speed reducer from the pump, beverage lines and cooler. The speed reducer 37 facilitates the use of the conventional high speed motor for driving the pump at the desirable slow speeds that are sufficient for the purposes of my invention and which is preferred for the sake of minimizing the disturbance of the carbonated beverage that passes through the pump. For example, I have employed a motor running at 1750 R. P. M. with the speed reducer causing the pump to turn at 51 R. P. M. to deliver about 1½ gallons per hour. For many purposes the speed reducer 37 with a constant ratio of speed reduction has been found satisfactory, but where great variations in load are contemplated as for example where a plurality of kegs of different number are intended to be connected in a line at different times, as described more fully below with reference to Figure 7, I have found it advantageous to employ a variable speed reducer through which the speed of the pump may be varied to accommodate different loads of the system.

Preferably the compressor C with its conventional attendant motor and condenser, not shown, is also disposed exteriorly of the chamber 23 with the conventional refrigerant lines 38 penetrating the wall of the chamber 23 through closely fitting apertures and connected with the refrigerant side of the cooler I.

As shown in Figure 1, and as suggested above, the chamber 23 may be secured to the basement wall at an elevation convenient in reference to the height of the keg K and the tank T and the detachable connections 17 and 34 so that kegs and tanks may be readily moved to and from operative relation with and connection to the system. The sheath or pipe S containing the respective portions of the main supply line and the return line may be of whatever length is desirable or convenient to extend from the chamber 23 to the dispenser D and the faucet F at the bar B; it being suggested in Figure 1 that the several sheathed lines penetrate the floor 39 upon which the bar B and the conventional dispensing cabinet D repose. Since the conduit 22 need have an external diameter of only about $7/16''$ to $5/8''$, the sheath S, if formed of sponge rubber tubing or the like, need only be about $1½''$ in external diameter to give satisfactory insulation for and protection of the beverage conduits even if it is as much as 50 feet long, and therefore very great facility of relative location of the several parts of the system is afforded.

The conduits 21, 22 and 31 are preferably thin walled, (about $1/32''-1/16''$ thickness, depending on their size) flexible, smooth surfaced, extruded polyethylene, tasteless and odorless plastic tubes, capable, of course, of safely withstanding pressures exceeding the maximum employed, such as about 30 pounds per square inch for warm beer. Throughout the supply line L I prefer to have the several conduits, fittings and cooling coils afford a passage of uniform effective cross-sectional area equal to a tube of about $3/8''$ internal diameter. Especially in the supply line where the flow is relatively rapid when beverage is drawn (as at about 2½ ounces per second) I prefer that if there be any deviation from uniform effective area of the line that the area decrease in the direction of flow. In the layout of Figure 1 substantial and satisfactory uniformity is had in the supply line with the conduits 20, 21 and the cooling coils of $3/8''$ I. D. and the conduit 22 of ½" I. D. The return conduit 30 being preferably of about ¼" I. D. and a little more than $5/16''$ O. D. leaves the effective area in the conduit 22 about equal to or slightly less than the $3/8''$ I. D. tube. The return line of ¼" I. D. throughout has been found satisfactory especially for use with but one keg on the line as shown in Fig. 1. Where more kegs are put on the line or where the lines are much lengthened and greater volumes of beverage are recirculated prudence and good engineering suggest that the line loss be reduced as by increasing the effective area. For facility of tapping and disconnecting the kegs K, I prefer that the conduits 20 and 35 be flexible and formed of rather heavy walled flexible, preferably extruded plastic polyethylene or Koroseal tubing and of as short length as practicable.

One of the advantages of this form of my invention is that the kegs do not need to be kept in cold storage rooms or spaces, but rather may be placed in an open basement or in any room or space at room temperature; their own insulating properties being sufficient to restrict undue heat-gain whilst the temperature of the beverage therein is being reduced to or held at its desirable cool temperature. Once the keg or kegs are cooled it is, of course, a lesser chore to merely keep them at the desired cool temperature. Should the air in the room around the keg K become unusually warm it would be prudent and economical to cover it with a blanket or otherwise modestly augment the insulation between the beverage therein and the air of the room or space in which the keg is disposed. Although I have suggested that the keg and the compartment 23 be placed in the basement under the floor of the bar and dispenser, the facility of my invention is such that all of the elements of the system can be tucked under the bar, gathered as near or spread as far from the dispenser and faucet F as may be found convenient in any given installation.

In the operation of this form of my invention the several elements of the system being connected as described above and assuming a keg to be freshly tapped and connected into the gas and beverage lines, the motor M and compressors C are energized whereby the beverage is induced to flow from the bottom of the keg via the supply line L through the cooler I to the shank of the faucet, thence back through the return line R through the pump P to the keg, re-entering the keg at the bung 26. I prefer the capacity of the compressor and cooler be such that even when the beverage in the keg should at first be as warm as room temperature when it is first tapped, that the beverage leaving the coils of the cooler will be reduced down to approximately 36° to 38° F. even when beverage is being drawn through the faucet F and the cooling coils at the maximum dispensing rate. When the faucet is closed the beverage flowing from the cooler to the faucet will reach the faucet with but a very small rise in temperature depending somewhat on the length of the lines and the insulating value of the sheath S so that beverage at the temperature desired for serving will always be provided in the shank of the faucet. Beer flowing back in the return line will tend to be redelivered to the keg at approximately the same temperature that the beverage has when it leaves the cooler and therefore the cold beverage from the return line co-mingling with the warmer beverage at the keg immediately begins to assert its cooling influence upon the warm beverage in the keg. Using a pump having a capacity of about 2 gallons per hour, I have found that I can reduce the temperature of beverage in a quarter barrel keg from about 70° F. down to 42° F. in about half a day more or less depending on the insulation possessed by the keg. Then with the compressor set to deliver cool beverage from the cooler at about 36° to 38° F., the contents of the keg will be easily maintained around 40° to 42° F. even though exposed to room temperature in warm weather.

As the keg is cooled the natural $CO_2$ pressure of the beverage tends to fall and the same is compensated for by the regulating valve V depending on the rate at which the beverage is dispensed and the resulting relative volumes of gas and liquid in the keg. When the supply of beverage in the keg is exhausted the motor M is shut off, the cocks between the several parts of the system and the keg are also shut off, the empty keg removed and a new full keg tapped and connected in the conventional way.

Meanwhile, and so long as a keg with beverage is "on the line," the continuously flowing beverage stream is maintained throughout the system. Whenever the faucet is opened beverage is drawn from the beverage stream that has been given the correct desired temperature and pressure at the faucet and is in continuous motion while the faucet is closed, that flows or tends to continue to flow while the faucet is open and that continues or resumes its full recirculating flow as soon as the faucet is closed.

Figure 4:
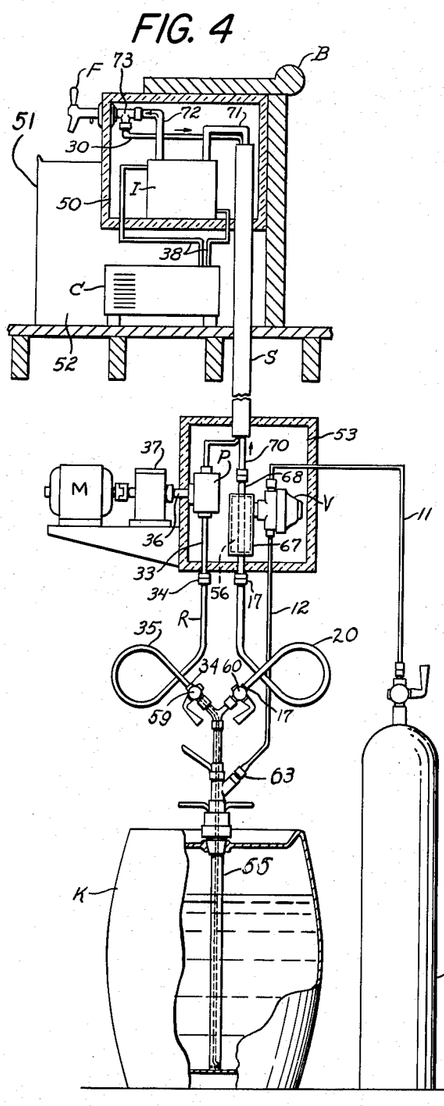
Figure 4 is a partially diagrammatic layout of a second preferred form of system embodying my invention.
Figure 6:
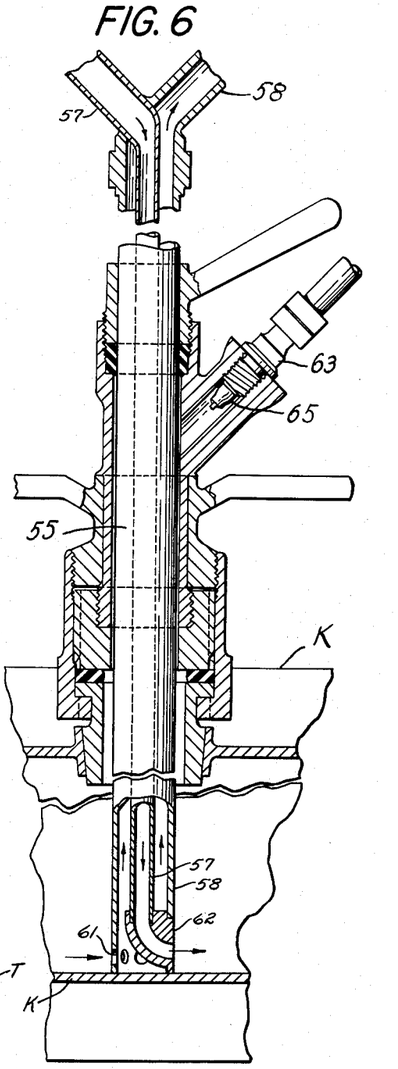
Figure 6 is a partially broken longitudinal section of the multiple tap rod employed in the system of Figure 4.

Referring now to the form and embodiment of my invention illustrated in Figs. 4–6 of the drawings, wherein parts like those described above are identified by the reference characters used above, the cooler I is disposed in an upper insulated cold compartment 50 of the dispensing cabinet 51 at the bar B, and the compressor C, preferably water cooled, is disposed in a ventilated lower compartment 52 thereof; the refrigerant lines 38 passing through the insulated common wall of the two compartments and the sheath S containing the beverage supply and return lines L and R respectively entering the compartment 50 through a closely fitting aperture in one of the walls, and the shank of the faucet F extending into the cold compartment through the "front" wall thereof. In this form of my invention the pump P is connected in the return line R in the same way and for the same purposes described above; the pump and adjacent portions of the return line being located in an insulated compartment 53 with the pump drive shaft 36 penetrating one of the walls of the compartment; the speed reducer 37 and the motor M being located exteriorly of the compartment 53 as above described with respect to the compartment 23. The sheath S with the supply and return lines enter the compartment 53 so that the supply and return lines are protected against heat-gain in and between the compartments 50 and 53.

In this form of my invention both the supply and return lines communicate with the interior of the keg K adjacent the bottom thereof through separate dual passages provided in the tap rod 55, see also Figure 6; the thermal responsive fluid for actuating the regulating valve V being contained in an elongated pressure generating chamber 56 which encompasses the supply line and communicates with the working chamber of the valve V wherewith to actuate the valve in the same way and for the same purposes as the valve V was first above described, but in response to the temperature of the beverage flowing in the supply line externally of the keg K. The tap rod 55 in this form of my invention has an inner conduit 57 connected at its upper exposed end to the return line R and disposed within an outer conduit or tube 58 which is connected at its upper end to the supply line L. Preferably the upper end of each of the conduits 57 and 58 have separate closure valves or cocks 59 and 60 and detachable couplings associated therewith for removable connection with the adjacent flexible hose portions 20 and 35 respectively corresponding to the like portions of those lines first above described. At the lower end of the tap rod 55 the outer conduit 58 is apertured as at 61 to admit beverage from the lower part of the keg thereinto and the lowermost part of the inner conduit 57 is fitted into an elbow 62 which diverts the flow of fluid from the return line into the keg in a horizontal direction away from the tap rod. Preferably the apertures 61 face oppositely of the exhaust leg of the elbow to induce an internal flow of beverage in the keg more or less in the direction suggested by the arrows in Figs. 4 and 6. In this way the contents of the keg are cooled efficiently by the cool beverage flowing thereto from the return line R and the coaxial disposition of the conduits 57 and 58 in and of the tap rod function as a counterflow heat exchanger tending to cool the outflowing beverage somewhat. Near the point where the tap rod penetrates the upper wall of the keg an appropriate fitting 63 corresponding to the fitting 13 above described is provided for connection with the gas line 12 leading to the regulating valve V and providing communication between the space within the upper portion of the keg and the valve V. Gas under pressure is supplied to the regulating valve V from the tank T by the gas line 11 as described above and in my prior patent. A conventional one-way rubber tip valve 65 only admits gas to the keg.

The pressure generating chamber 56 may conveniently comprise an outer cylindrical part 67 and an inner coaxial tube 68 which penetrates end closures for the outer part 67 whereby to provide a closed sealed chamber between the inner and outer parts within which the thermal fluid is disposed in accordance with the teaching of my prior patent. Preferably the inner tube 68 is formed of metal of high heat conductivity and the ends of the tube have associated therewith appropriate parts for coupling the lower end thereof to the portion 20 of the supply line and the upper end thereof to the portion 70 of the supply line; the inner tube 68 preferably having the same internal diameter as the parts of the supply line with which it is connected and forming with the other parts of the supply line continuous fluid conducting means leading from the tap rod to the faucet.

In this form of my invention the tube 70 enters the insulating pipe or sheath S within the cold chamber 53 and leaves the sheath S within the upper cold insulated chamber 50 where it is connected to an extension 71 of the cooling coil disposed in the cooler I but not shown. An extension 72 of the cooling coil comprising the extreme upper end of the supply line is connected to the shank 73 of the dispensing faucet F, see Figure 5. The faucet shank 73 is provided with a side outlet 74 near the closure element of the faucet and is connected with the return line R, and particularly the conduit portion 30 thereof, so that the circulating stream of beer, induced to move by the pump P, flows through the shank of the faucet keeping the faucet and faucet shank cool and maintaining a cool flowing stream of beverage at the correct temperature and pressure moving past and closely adjacent the outlet port of the faucet. In this form of my invention I prefer that the conduit portion 30 of the return line R lie along side the conduit portion 70 of the supply line within the flexible sheath S; the conduit 30 extending from the shank of the faucet to the sheath within the cold insulated chamber 50 then continuing within the sheath and emerging therefrom within the cold chamber 53 whence it is connected to the intake side of the pump P. The outlet side of the pump P is connected with the portion 35 of the return line by the same length of conduit 33 passing through the lower wall of cold chamber 53 and being joined to the hose 35 by a connection 34 as above described; the hose 35 also having another detachable connection 34 with the conduit 57 of the tap rod adjacent the hand cock 59 as above described. Similarly the detachable connections 17 are provided at the opposite ends of the flexible hose connection 20 of the supply line.

In this form of my invention the cold chamber 53 along with the pump, motor, pressure regulating valve and associated parts may be located at any place remote from the dispensing cabinet 51 and its associated mechanisms within the length of the sheath S, which as mentioned above may be as long as 50 feet or more or as short as may be convenient; my teaching and preference being that the compartment 53 be disposed conveniently adjacent whatever place one desires to locate the keg K for the facility of bringing kegs to and from the tap rod and associated parts. In this form of my invention as well as in the preceding form, I find it practicable to obviate the use of any particular cold storage room or compartment for the keg since its self-insulating properties or any temporary covering such as a blanket has been found entirely sufficient to facilitate the cooling of the contents thereof by the internal circulation that I provide of the contents themselves and the cooling thereof in their flow through the keg and the circuit which embraces the cooling coil. For these reasons the cold compartment 53 with its associated instrumentalities with the keg disposed closely adjacent thereto may all be located in an open basement room under the room in which the bar and dispenser are located or for that matter may be located in a room above or along side the dispenser. It follows, of course, that the compartment 53 with its associated parts and the keg may be located under the bar near or far from the dispenser and its associated parts as the greatest convenience may suggest or require.

In this embodiment of my invention the characteristics of the structure, method, mode of operation and results described above are largely present. The return line R preferably has about ¼" clear, smooth inside diameter throughout its length from the shank of the faucet to the elbow 62 in the bottom of the tap rod and I have found it advantageous that the supply line L have a clear, smooth, unimpeded passage of about ⅜" internal diameter from the tap rod through the cooling coils to the shank of the faucet. Within the tap rod the effective area of the supply line in the space between the outside of the tube 57 and the inside of the tube 58 is preferably of no smaller net cross-sectional area than that of a ⅜" I. D. tube. With lines of these sizes and maintaining a $CO_2$ gas pressure in the system in small uniform excess of the natural pressure of the beverage flowing through the generator 56, I obtain an adequately rapid rate of withdrawal of beverage through the faucet, preferably at about 2½ ounces per second, by appropriate adjustment of the faucet orifice through the tapered plug 29, Fig. 2, restricting the orifice when the gas pressure in the system is high and opening the orifice when the pressure is low as above described with especial reference to Fig. 2. When a warm keg is tapped the first beer to flow through the generator 56 will be at substantially keg temperature and will cause the valve V to put a correspondingly high $CO_2$ pressure on the contents of the keg. After a little recirculation of beer the temperature of beer in the keg will begin to fall and the beer flowing out of the tap rod 55 is cooled more than the beer remaining in the keg by virtue of its giving heat to the cold beer from the return line in the inner tap rod conduit 57. Thus the beer entering the generator 56 is tempered towards its minimum desired temperature more rapidly than in the form shown in Fig. 1, and consequently the maximum pressure applied to the system is of shorter duration, anticipating somewhat the cooling of the supply in the keg and as a practical matter reducing the maximum initial pressure and therefore the range of pressures controlled by the valve V. Then for practical operating purposes especially with this form of my invention, the plug 29 in the faucet may be turned to one restricted position when a fresh warm keg is first tapped and then turned to one other more open position when the operator becomes aware that flow through the faucet is markedly too slow. With these means and practices the beverage is treated, cooled, pressurized and dispensed without deleterious release of gas from the beverage at or beyond the faucet or within the system and without deleterious cavitation or separation at the intake side of the pump or elsewhere in the system. My experience has been that it is preferable to have the main supply line about twice the size of the return line and about four to six times the size of the faucet orifice so that during periods of drawing beverage through the faucet the pump will not tend to be starved for input fluid. When one keg alone is connected into my system as shown in the embodiments heretofore described, I have found that when the pump is operating at a rate to cause a flow of about 2 gallons per hour that the keg and all the other parts of the system will be cooled with desirable rapidity and maintained satisfactorily cool thereafter and the pressure drop across the pump while beverage is not being withdrawn through the faucet F will be very small, measurable in terms of a few ounces more or less. The smallness of the pressure drop across the pump, a thing which I prefer, is facilitated by the smoothness of the interior surfaces of the supply and return lines, the freedom from pulsations and internal agitations in the pump and the slow positive displacement action thereof. When the faucet is opened the pressure in the return line R ahead of the pump on the intake side is reduced, but I have found specifically that the pump intake pressure remains safely high and/or without deleterious effect on the beer being circulated with the pump speeded up and delivering about 4 gallons per hour and the ¼" return line having a length of about 30 feet ahead of the pump and the pressure in the system as a whole being near its minimum. Further considerations of the rates of recirculation and the factors bearing on the best ways of practicing my invention are discussed below with reference to the pump by-pass valves shown in Figs. 7 and 8.

Figure 7:
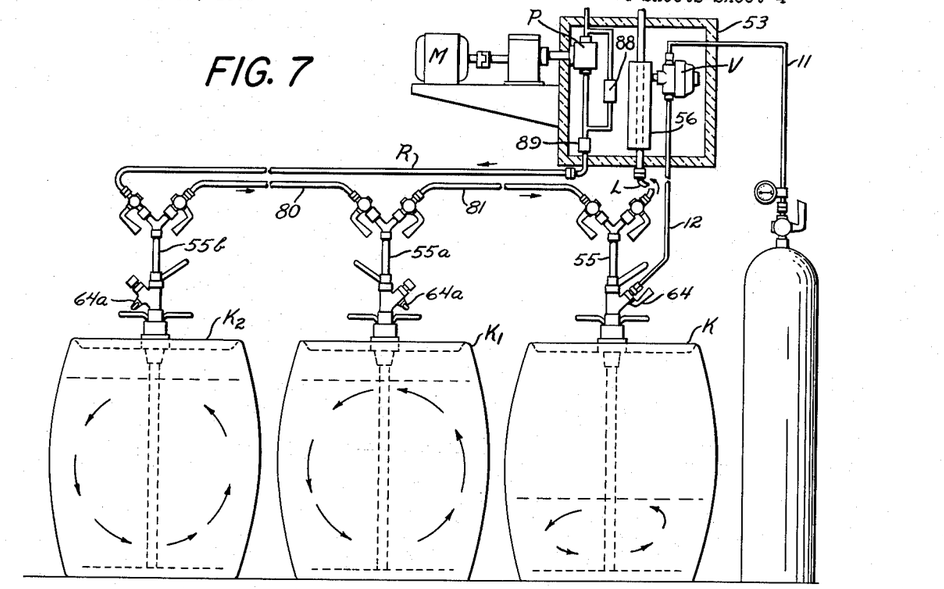
Figure 7 is a modification of the layout of Figure 4 showing a plurality of supply vessels or kegs connected in the system.

In Fig. 7 there is illustrated the facility of my invention in respect to storing, cooling and/or maintaining cool a plurality of kegs of the same kind of beverage while consuming beverage from the kegs, as I prefer, seriatim. That is to say, my invention obviates the need of separate cold storage space and cooling means for a plurality of reserve kegs as well as a single keg "on the line" at any given time. In Figure 7 it may be assumed that the entire system is the same as that described in reference to Figs. 4 to 6 incl. with the exception of the addition of additional kegs $K_1$ and $K_2$ each with a tap rod, 55a and 55b, corresponding to the tap rod 55 in the keg K and with interconnecting conduits 80 and 81 completing the circuit of beverage throughout the system and all the kegs. More particularly the return line R is connected to the inner tube of the tap rod 55b inserted in the keg $K_2$ whereby the cold beverage from the return line enters the bottom of the keg $K_2$, co-mingles with the contents thereof, and cooled beverage from the keg $K_2$ flows up the outer tube of the tap rod, giving some heat to the beverage flowing in through the inner tube, and into the line 80 which in turn conducts the beverage to the inner tube of the tap rod 55a into the keg $K_1$ whence it co-mingles with the beverage therein cooling the same, and, in turn, cooled beverage from the keg $K_1$ flows out of the outer tube of the rod 55a in heat exchange relation to the inner tube and through the conduit 81 into the keg K via the inner tube of the tap rod 55 and out from the keg K via the outer tube of the tap rod 55 to the supply line L and back through the system and the cooling coils thereof. Gas under pressure controlled by the regulating valve V is admitted to the keg K through the line 12 and the open cock 64 of the tap rod 55; the corresponding cocks 64a and 64b of the rods 55a and 55b being closed and not connected to the gas supply in the first instance, as I prefer. Since the beverage is coolest as it enters the keg $K_2$ and tends to be warmer as it leaves the keg K, because the flowing beverage is taking up heat from contents of the kegs, the gas pressure in the keg K will be commensurate with the temperature of the contents thereof, i. e. substantially the least cool beverage in the system as measured in the supply line L within the pressure generator 56. By introducing gas under pressure to the keg K the consumption of liquid beverage is substantially confined to the keg K until all the beverage therein is consumed, whereupon the keg K is taken off the line, the supply line L connected to the outlet conduit of the tap rod 55a and the gas line 12 connected to the gas connection thereof through the valve 64a, and beverage is then withdrawn from the keg $K_1$. By continuing to draw beverage and by repetition of the above sequence successive kegs will be emptied while all and/or all kegs remaining "on the line" will be cooled. While I've illustrated an arrangement of kegs in "series" in Fig. 7, as I prefer, it is practicable to modify the connections appropriately to arrange the kegs in "multiple," to borrow electrical terminology, in the beverage circuit and cool them all at substantially the same rate. Whether the beverage stream flows through the kegs in series or multiple, I prefer to select and control the consumption from among a plurality of kegs by applying the gas under pressure to the keg or kegs, the contents of which are first sought to be consumed.

The by-pass valve 88 shunting the pump P and the check valve 89 disposed beyond the shunt connection away from the outlet side of the pump are described below.

Before turning to Fig. 8 it is appropriate to mention that one of the uses and advantages of my invention is that of recharging flat beer or other carbonated beverage that has lost its proper $CO_2$ content. With the hook-up of Figs. 1, 4 or 7 one or more kegs of flat beverage may be put "on the line" for a period, such as over night or over a week-end, when beverage is not being drawn, and by virtue of the continuous circulation and cooling and imposition of $CO_2$ gas under the pressure controlled by the regulating valve the beverage will be promptly charged with the gas and rehabilitated to its pristine state of life and flavor. Recharging one flat keg may be hastened by hooking it up in series with a charged keg as in the circuit of Fig. 7, preferably putting the flat keg in the position of the keg K with the $CO_2$ connected to it directly and the live keg or kegs in the position of the kegs $K_1$ and $K_2$.

Figure 8:
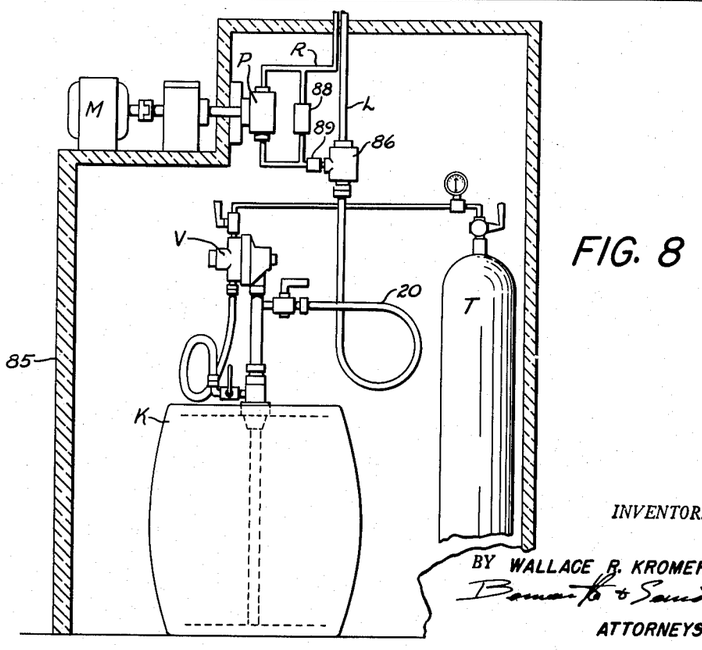
Figure 8 is a modified form of the system shown in Figure 4 with the recirculating beverage circuit closed without the keg.

In Fig. 8 a modified and useful form of my invention is disclosed, differing from the embodiments hereinabove referred to particularly in excluding the contents of the keg or supply vessel from the circuit of the continuously flowing stream of beverage per se. In this form the beverage that is dispensed is circulated and cooled but the contents of the keg are not to be cooled by the recirculating beverage stream, and therefore I suggest this modification be employed to its best advantage where the beverage supply does not need to be cooled for its preservation, as in the case with various soft or so-called cola drinks, or where cold storage space for the kegs or supply is available "free," as in the case where the space is being cooled for the preservation of other things, food or drink, and the beverage, such as beer, requires coolness for its preservation and may have the benefit of such existing facilities.

Assuming the latter condition by way of example and the existing cold room 85 available for cooling and cold storage of the keg K, the keg is tapped with the tap rod R employed in the embodiment illustrated in Fig. 1 and in my prior patent with the same pressure control means including the regulating valve V, tank T and the same appropriate lines and connections, along with the outlet conduit 20 in which the beverage flows from the keg under the influence of the gas pressure when the dispensing faucet is opened. The outlet line 20 is, however, connected to the T fitting 86 which in turn is connected "straight through" to the supply line L and has its leg or branch connected to the return line R on the outlet side of the pump P. The pump, motor, supply and return lines, the latter disposed in the sheath S, may all be identical with those illustrated in Figs. 4 to 6 incl., leading to the same dispenser, cooler, faucet, etc., shown and described in and in reference to those figures. Thus, in the form shown in Fig. 8, the flowing stream of beverage runs from the pump P to the T 86 through the supply line L through the cooler I to the faucet F and back to the pump through the return line R, performing the offices and having the advantages, pro tanto, above described, keeping all parts of the contents of the supply line to and including the faucet cool, fresh and palatable and under the desired pressure and temperature for drawing from the faucet.

Applicable to all forms of my invention and specifically disclosed in Figs. 7 and 8, I may provide a conventional by-pass pressure actuated spring closing relief valve 88 shunted across the pump P and adjusted to open only to permit beverage to flow from the outlet back to the inlet side of the pump when the pressure drop across the pump exceeds a predetermined value, such for example, five or ten pounds. When using such a by-pass valve I also provide a check valve 89 to prevent back-flow up the return line R to or toward the faucet through the by-pass valve; the positive displacement pump characteristically preventing back-flow through the pump so long as it is not reversed, a condition not presently contemplated. The employment of these valves reduces or eliminates the hazard of cavitation on the intake side of the pump and/or "breaking-up" of the carbonated beverage particularly in the return line between the faucet and the pump which might be incurred especially when variously, the faucet is opened wide, a relatively high pump speed and delivery is desired, a long return line is involved and a condition of minimum pressure exists in the system. That is to say, in the examples mentioned above with the pump delivering about 1½ to 4 gallons per hour the pressure drop across the pump while the faucet is closed is small or so substantially negligible that cavitation or separation has not been observed within my tests and observations. However, when beverage is being drawn rapidly whilst flow through the return line and through the pump has been maintained at about such rates, cavitation or separation has not been encountered albeit the pressure drop across the pump has been observed to be high, approaching, as I presently believe, the point where cavitation or separation might begin. It will be appreciated that several variables are present. Pump outlet pressure approximately equals the $CO_2$ pressure maintained in the keg, depending on the temperature of the contents, and with beer, for example, may vary from about 15 to 28 pounds. Pump inlet pressure, when the faucet is open, depends, inter alia, on the pressure in the keg and supply line, and at the shank of the faucet, the effective size of the faucet orifice and the line friction in the return line between the faucet and the pump. Since, for the reasons mentioned above, I prefer to restrict the net faucet opening when the pressure in the system is high, and vice versa, it will be appreciated that with a constant pump speed in the absence of a by-pass valve, the inlet pressure at the pump with the faucet open may well vary from but little above atmospheric when the pump outlet pressure is low to about ⅓ to ½ pump outlet pressure when the same is high, all of which I have observed without deleterious effects. For practical purposes I have found that the slow pump speeds and deliveries mentioned above taken with return lines having small line losses have given the desirable results described above. However, when, for example, a plurality of kegs are sought to be cooled, Fig. 7, and/or when the kegs must be kept in a distinctly warm place and/or the supply and return lines must or are desired to be long and small, then, particularly, the employment of the by-pass and check valves 88 and 89 contribute to the more full enjoyment of my invention and permit a higher rate of flow to be maintained by the pump and throughout the circulating stream especially when the faucet is closed and affords protection and insurance against harmful cavitation or separation under the conditions conducive thereto as when the faucet is open. Under conditions that cause the by-pass valve to open when the faucet is opened the flow of beverage from the faucet to the pump will be reduced or may be stopped momentarily, but that will not detract from the other advantages of my invention because, inter alia, the recirculating flow will be resumed in full when the faucet is closed and the continuity of flow of beverage at least through the supply line will always be maintained.

For like reasons and purposes it is not without my teaching to retard the pump when the faucet is open as by stopping or slowing down the pump motor or changing the speed reducer either manually or automatically in response to such effects as faucet movement or pump intake pressure.

In all forms of my invention I have used with best present satisfaction a model PP–IM pump made by Eco Engineering Company of Newark, New Jersey, having, as indicated above, a capacity of about 1½ gallons per hour at 51 R. P. M. and correspondingly greater capacities at greater speeds, regard being had for intake and outlet pressures discussed above. This pump is of the so-called squeeze type having two chambers and employing two cylindrical slightly resilient odorless and tasteless impellers mounted to turn free on opposite cylindrical, eccentrics along the axis of a common drive shaft in separated axially spaced cylindrical working chambers; both impellers having an external longitudinal slot in which is slidably received a single guide and vane member located by a notch in the compartment separator and being disposed in the port area of the pump to divide the port area into intake and discharge compartments respectively common to both working chambers whereby to give overlapping strokes and a substantially smooth discharge. A more complete description of this type of pump will be found in U. S. Patent No. 2,237,075. I have found it practicable when using pumps having, for example, brass bodies to chrome-plate or silver-plate the surfaces with which the beverage comes in contact to give those surfaces tastelessness with respect to the beverage being pumped. Hardness of the plating especially on the surfaces of the working chambers contacted by the impellers is of advantage in resistance to wear. I am not now prepared to delineate all the characteristics of other pumps that make them desirable for use with my invention under all conditions. My limited experience with small centrifugal pumps running at relatively high speeds was that they made froth rather than moved fluid. Therefore I turned to and found satisfactory the positive displacement type pump with slow moving parts contacting the beverage and free flowing smooth, rounded passages, with, of course, the conventional sanitary features requisite for handling foods including appropriate materials with ready disassembly and cleanability.

In the preceding description of my invention illustration has been confined to the treating and dispensing of a single kind of beverage from a single faucet from a single source of supply. I have also employed my invention to treat and dispense a plurality of different beverages from different supplies through different faucets, using however certain parts of the system for multiple duty. For example, if it were desired to dispense beer and a soft carbonated drink from adjacent faucets at the same dispenser, and necessarily from different kegs at different pressures but at the same temperatures, separate fluid circuits and systems, each following the teaching of my invention would be established, but I would prefer to drive the different pumps from the same motor, possibly using different speed reducers for each pump, carry the separate supply and return lines in the same sheath or insulating pipe, immerse the separate cooling coils in the same cooler, chilled by the same refrigerant, and use a common supply of $CO_2$ controlled by separate automatic regulating valves to impose correct pressures on the different kegs. Similarly common cold chambers and dispensing cabinets could be used for both systems and circuits.

While I have illustrated and described my invention in certain preferred and modified forms, practices and embodiments, other modifications, changes and improvements will occur to those skilled in the art who come to understand and appreciate my invention without departing from the spirit and substance thereof, and therefore I do not want the scope of my patent to be limited to the particular forms of my invention herein specifically illustrated and described nor limited in any other manner inconsistent with the promotion of the art made by my invention.

I claim:

1. The method of treating beer in a system which includes a keg, a cooler, a faucet, a circulating pump, a thermal responsive element and fluid conducting means therebetween which comprises continuously circulating beer from the bottom of the keg past said element through the cooler to the faucet and back through the pump to the keg, cooling the beer in the course of its circulation, applying $CO_2$ under pressure to the top of the keg, controlling the $CO_2$ pressure with respect to the temperature of the beer as measured by said element and limiting the $CO_2$ pressure to a predetermined value in excess of the natural pressure of beer at the temperature measured by said element.

2. The method of cooling a keg of carbonated beverage which comprises moving beverage in a flowing stream in a continuous circuit through the keg and through a cooler disposed externally of the keg, cooling the beverage stream solely externally of the keg, co-mingling the cooled beverage with the beverage in the keg, imposing gas pressure on the beverage in the keg substantially corresponding to natural pressure of the gas in the beverage at the temperature thereof, and reducing the imposed gas pressure as the temperature of the contents of the keg is reduced.

3. The method of treating carbonated beverage comprising moving beverage in a flowing stream past a point of withdrawal and through a plurality of kegs of beverage, cooling the stream solely externally of the kegs, co-mingling the cool stream with the contents of the kegs and cooling the contents thereby, applying $CO_2$ gas under pressure in slight excess of the natural pressure of the contents of the warmest keg on the contents of said warmest keg, drawing beverage from time to time from said stream at said point from said kegs and directing beverage from the kegs into said stream to be cooled in its flow toward said point.

4. In a cooling and dispensing system for a gas charged liquid the combination of a keg containing the said charged liquid to be cooled and dispensed, a faucet, a source of gas under pressure, cooling means, fluid conducting means comprising a closed circuit running from below the liquid level in the keg to and from the faucet and through said cooling means, a multiple passage tap rod in said keg through one passage of which liquid from the faucet enters the keg and through another passage of which liquid leaves the keg, means for circulating said charged liquid in said circuit, means for conducting said gas under pressure to said keg above the liquid level therein, and means for regulating the pressure of gas in said keg with reference to the temperature of said liquid.

5. In a beer storage and cooling system, the combination of cooling means, containing means for a supply of beer to be cooled and dispensed, a pump, fluid conducting means leading beer from said supply through said cooling means and said pump and back to said supply, a source of $CO_2$ gas under pressure, and means responsive to the temperature of beer in the system for applying said gas thereto.

6. In a system for cooling and dispensing a carbonated beverage such as beer or the like, said system having a supply vessel, a faucet and means providing a cooling zone, the vessel being separate and apart from the cooling zone, beverage conducting means providing a substantially closed circuit and including substantially parallel conduits disposed closely adjacent one another for substantially direct heat exchange between beverage contained in said parallel conduits, one of said parallel conduits being connected to carry beverage toward the faucet, another of said parallel conduits being arranged to carry beverage away from the faucet, said conducting means including an element remote from the supply vessel and in said cooling zone for chilling beverage flowing therethrough, means for maintaining gas pressure on beverage in the circuit, and pump means for circulating beverage through the conducting means.

7. In a system for cooling and dispensing a carbonated beverage such as beer or the like, said system having a supply vessel, a faucet and means providing a cooling zone, the vessel being separate and apart from the cooling zone, beverage conducting means providing a substantially closed circuit and including substantially parallel conduits disposed closely adjacent one another for substantially direct heat exchange between beverage contained in said parallel conduits, one of said parallel conduits being connected to carry beverage toward the faucet, another of said parallel conduits being arranged to carry beverage away from the faucet, an insulating sheath embracing the parallel conduits, said conducting means including an element remote from the supply vessel and in said coupling zone for chilling beverage flowing therethrough, means for maintaining gas pressure on beverage in the circuit, and pump means for circulating beverage through the conducting means.

8. In a system for cooling and dispensing a carbonated beverage such as beer or the like, said system having a supply vessel, a faucet and means providing a cooling zone, the vessel being separate and apart from the cooling zone, beverage conducting means providing a substantially closed circuit and including a pair of substantially parallel conduits disposed one within the other for substantially direct heat exchange between beverage streams separated thereby and contained therein, one of said parallel conduits being connected to carry beverage toward the faucet, another of said parallel conduits being arranged to carry beverage away from the faucet, said conducting means including an element remote from the supply vessel and in said cooling zone for chilling beverage flowing therethrough, means for maintaining gas pressure on beverage in the circuit, and pump means for circulating beverage through the conducting means.

9. In a system for cooling and dispensing a carbonated beverage such as beer or the like, said system having a supply vessel, a faucet with a hollow metal shank, a chilling device providing a cooling zone, the vessel being separate and apart from the cooling zone, beverage conducting means providing a substantially closed circuit and including substantially parallel conduits disposed closely adjacent one another for substantially direct heat exchange between beverage contained in said parallel conduits, one of said parallel conduits being connected to carry beverage toward the faucet, another of said parallel conduits being arranged to carry beverage away from the faucet, one of said conduits being connected to the hollow shank of the faucet, another of said conduits extending into the interior of said hollow shank, said conducting means including an element remote from the supply vessel and in said cooling zone for chilling beverage flowing therethrough, means for maintaining gas pressure on beverage in the circuit, and pump means for circulating beverage through the conducting means.

10. In a system for cooling and dispensing a carbonated beverage such as beer or the like, said system having a supply vessel, a faucet with a hollow metal shank, a chilling device providing a cooling zone, the vessel being separate and apart from the cooling zone, beverage conducting means providing a substantially closed circuit and including a pair of substantially parallel conduits disposed one within the other for substantially direct heat exchange between beverage streams separated thereby and contained therein, one of said conduits being connected to the hollow shank of the faucet, another of said conduits extending into the interior of said hollow shank, said conducting means including an element remote from the supply vessel and in said cooling zone for chilling beverage flowing therethrough, means for maintaining gas pressure on beverage in the circuit, and pump means for circulating beverage through the conducting means.

11. In a system for cooling and dispensing a carbonated beverage such as beer or the like, said system having a supply vessel, a faucet with a hollow metal shank, a chilling device providing a cooling zone, the vessel being separate and apart from the cooling zone, beverage conducting means providing a substantially closed circuit and including a pair of tubular conduits nested one within the other for substantially direct heat exchange between beverage streams flowing therethrough, said one conduit extending into the interior of the hollow shank of the faucet and being connected to carry beverage away from the faucet, said other conduit being connected to the hollow shank of the faucet to carry beverage toward and into the faucet, said conducting means including an element remote from the supply vessel and in said cooling zone for chilling beverage flowing therethrough, means for maintaining gas pressure on beverage in the circuit, and pump means for circulating beverage through the conducting means.

12. The system of claim 7 having means providing a heat insulated compartment remote from the faucet, the cooling zone and the pump being located within the insulated compartment, and the sheath and conduits embraced by the sheath extending substantially between the compartment and the faucet.

13. In a system for storing, cooling and dispensing a carbonated beverage such as beer or the like, said system including a faucet, means including a heat exchanger providing a cooling zone, a supply vessel for containing a relatively large body of the beverage under pressure, beverage conducting means providing a closed circuit for the continuous flow of beverage back and forth substantially between the faucet and the supply vessel, the conducting means including an element in the cooling zone for chilling beverage flowing therethrough, means for maintaining gas pressure on beverage in the circuit, and pump means for circulating beverage through the conducting means, said system being characterized in that the conducting means includes a tap rod comprising a pair of nested tubes extending into the supply vessel substantially to the bottom of the latter, one of the tubes providing a passage substantially from adjacent the bottom of the supply vessel for beverage being withdrawn from the latter to flow over the circuit to the faucet and return, and the other of the nested tubes providing another passage for leading returning beverage substantially to the bottom of the supply vessel.

14. The system of claim 13 characterized in that the tubes are formed with openings at their lower ends through which circulating beverage enters and leaves the tubes, the openings being differently directed to induce circulation of beverage within the body thereof contained in the supply vessel.

15. In a system for storing, cooling and dispensing a carbonated beverage such as beer or the like, said system including a faucet, means including a heat exchanger providing a cooling zone, a supply vessel for containing a relatively large body of the beverage under pressure, the supply vessel being separate and apart from the cooling zone, beverage conducting means providing a closed circuit for the continuous flow of beverage back and forth substantially between the faucet and the supply vessel, the conducting means including an element remote from the supply vessel and in the cooling zone for chilling beverage flowing therethrough, means for maintaining gas pressure on beverage in the circuit, and pump means for circulating beverage through the conducting means, the combination of a heat insulated container spaced from the faucet and providing a compartment remote from the faucet, said heat exchanger and said pump means being disposed within the compartment in heat exchanging relation whereby to maintain the pump within desired temperature limits, and insulating means embracing the beverage conducting means substantially the entire distance between the compartment and the faucet.

16. The system of claim 15 with bracket means secured to and supported by the container on the outside of the latter, and drive means for actuating the pump means disposed on the outside of the container, supported by the bracket means and connected to the pump means through one of the walls of the container.

17. In a system for storing, cooling and dispensing a carbonated beverage such as beer or the like, said system including a faucet, means including a heat exchanger providing a cooling zone, a supply vessel separated and removed from the cooling zone for containing a relatively large body of the beverage under pressure, beverage conducting means providing a closed circuit for the continuous flow of beverage to and from the faucet, the conducting means including an element in the cooling zone for chilling beverage flowing therethrough, means for maintaining gas pressure on beverage in the circuit, and pump means for circulating beverage through the conducting means, the combination of a heat insulated container providing an enclosed compartment, said heat exchanger being disposed within the compartment, the faucet having a metal shank extending into the interior of the compartment in heat exchanging relation to the heat exchanger to be cooled by the latter, said conducting means including substantially parallel conduits disposed closely adjacent one another for substantially direct heat exchange between beverage streams flowing therethrough, and an insulating sheath embracing the parallel conduits.

18. The system of claim 17 with a second heat insulated container providing a second enclosed compartment remote from the first mentioned enclosed compartment container, said pump means being disposed in said second compartment, means for driving the pump means located outside the second compartment and connected to the pump means through one of the walls of the second container, and with the parallel conduits embraced in the sheath extending between the two heat insulated containers.

19. The system of claim 6 in which the means for maintaining gas pressure supplies $CO_2$ gas to beverage in the circuit in response to temperature variations of such beverage for regulating the pressure of the gas.

20. The system of claim 19 in which the gas pressure maintaining means comprises a fluid pressure regulator having a passage included in said circuit and a chamber surrounding said passage, thermal fluid in said chamber in substantially direct heat exchanging relation to beverage in the passage, and means responsive to pressure changes of the thermal fluid governing the supply of $CO_2$ gas to the circuit.

21. The system of claim 6 in which the circuit comprises a supply line leading from said vessel through said cooling zone to said faucet and a return line leading from said faucet through said pump means and back to said supply vessel, and means governing the gas pressure maintaining means associated with said supply line between said vessel and said cooling zone responsive to the temperature of beverage flowing therethrough for controlling gas pressure exerted upon beverage in said circuit, and said gas pressure maintaining means including means responsive to said temperature responsive means providing $CO_2$ gas under pressure to beverage in the circuit.

22. The system of claim 21 in which the faucet has an orifice of limited effective size, said main supply line is several times bigger in size than said orifice and said return line is smaller than said supply line but of greater size than said orifice.

23. The system of claim 6 in which said pump means is of the positive displacement type, and in which a by-pass valve is shunted across the pump means to maintain a predetermined pressure drop thereacross particularly when said faucet is open.

24. The method of cooling and dispensing a carbonated beverage such as beer or the like which comprises maintaining a relatively large body of the beverage under gas pressure, continuously withdrawing beverage from the body and conducting the withdrawn beverage over a closed path extending between the body of beverage and a dispensing point remote from the body, cooling the conducted beverage solely while the latter is in a portion of the path located intermediate the dispensing point and the large body of beverage, the path of the beverage including one portion extending between the cooling portion of the path and the dispensing point and a second portion substantially paralleling the said one path portion in side by side relation, the beverage in the one path portion being in substantially direct heat exchanging relation to the beverage in said second path portion substantially from the cooling portion of the path to the dispensing point, and withdrawing beverage from the stream at the dispensing point as desired.

25. A cooling and dispensing system for a carbonated beverage such as beer or the like, said system comprising a heat exchanger and a storage vessel separated from one another, beverage conducting means providing a closed circuit extending substantially between the heat exchanger and the vessel and continuous with beverage contained in the latter, the conducting means including substantially parallel conduits disposed closely adjacent one another for substantially direct heat exchange between beverage contained in the conduits, a faucet connected in the beverage circuit, pump means for circulating beverage through the circuit serially substantially to and from the vessel, to and from the heat exchanger, and to and from the faucet, means associated with the heat exchanger for withdrawing heat from the beverage in the circuit substantially solely in the heat exchanger whereby cooling of the beverage in the system occurs principally in the heat exchanger, the beverage flowing in that portion of the conducting means which extends between the heat exchanger and the storage vessel constituting substantially the sole effective cooling medium for such conducting means portion, and means for maintaining gas pressure on beverage in the circuit.

26. In a beverage cooling and dispensing system comprising a storage vessel having a bung and heat exchanger external to the vessel, conduit means extending between the vessel and the heat exchanger and pump means effecting a circulation of beverage into and out of the vessel and heat exchanger and back and forth between them, an improvement which comprises a tap rod extending into the vessel through the bung thereof, said tap rod having a plurality of passages extending longitudinally thereof, each passage opening through the end of the tap rod so that both the ingress and egress openings of the tap rod are immersed and below the surface of the beverage in the vessel.

References Cited in the file of this patent
UNITED STATES PATENTS

| | | |
|---|---|---|
| 732,122 | Schneider | June 30, 1903 |
| 950,295 | Marsden | Feb. 22, 1910 |
| 1,663,683 | Doughty | Mar. 27, 1928 |
| 1,879,317 | Klein | Sept. 27, 1932 |
| 1,979,219 | Bodine | Oct. 30, 1934 |
| 2,018,119 | Brouse | Oct. 22, 1935 |
| 2,043,856 | Knapp | Dec. 9, 1936 |
| 2,140,816 | Seitz | Dec. 20, 1938 |
| 2,335,595 | Kromer | Nov. 30, 1943 |